(12) United States Patent
Barr et al.

(10) Patent No.: US 6,460,892 B1
(45) Date of Patent: Oct. 8, 2002

(54) MUD FLAP ASSEMBLY

(75) Inventors: Graylin Patrick Barr, Fresno; Jay Ford, Madera, both of CA (US)

(73) Assignee: Betts Spring Company, Fresno, CA (US)

( * ) Notice: Subject to any disclaimer, the term of this patent is extended or adjusted under 35 U.S.C. 154(b) by 0 days.

(21) Appl. No.: 09/774,525

(22) Filed: Jan. 31, 2001

(51) Int. Cl.$^7$ ................................................ B62B 9/14
(52) U.S. Cl. ................................................ 280/847
(58) Field of Search .......................... 280/847, 851, 280/154, 848

(56) References Cited

U.S. PATENT DOCUMENTS

| | | | | |
|---|---|---|---|---|
| 2,124,513 A | * | 7/1938 | Bahr | 280/851 |
| 3,473,825 A | * | 10/1969 | Ochs | 280/851 |
| 3,521,903 A | * | 7/1970 | Rister | 280/851 |
| 5,050,908 A | * | 9/1991 | Betts | 248/302 |
| 5,816,617 A | * | 10/1998 | Huang | 280/154 |
| 5,833,283 A | * | 11/1998 | Shaw | 280/851 |
| 6,158,775 A | * | 12/2000 | Nickels | 280/154 |

* cited by examiner

*Primary Examiner*—Jack Lavinder
*Assistant Examiner*—Melanie Torres
(74) *Attorney, Agent, or Firm*—Thomas R. Lampe

(57) ABSTRACT

A mud flap assembly includes a hanger for attachment to a truck or other vehicle, the hanger including a horizontally disposed hanger portion. Connectors connect the mud flap to the hanger portion so that some of the flap projects above the hanger portion and some of the flap projects below the hanger portion. A conspicuity strip is attached to the flap and to the connector to add to the structural integrity of the assembly.

8 Claims, 3 Drawing Sheets

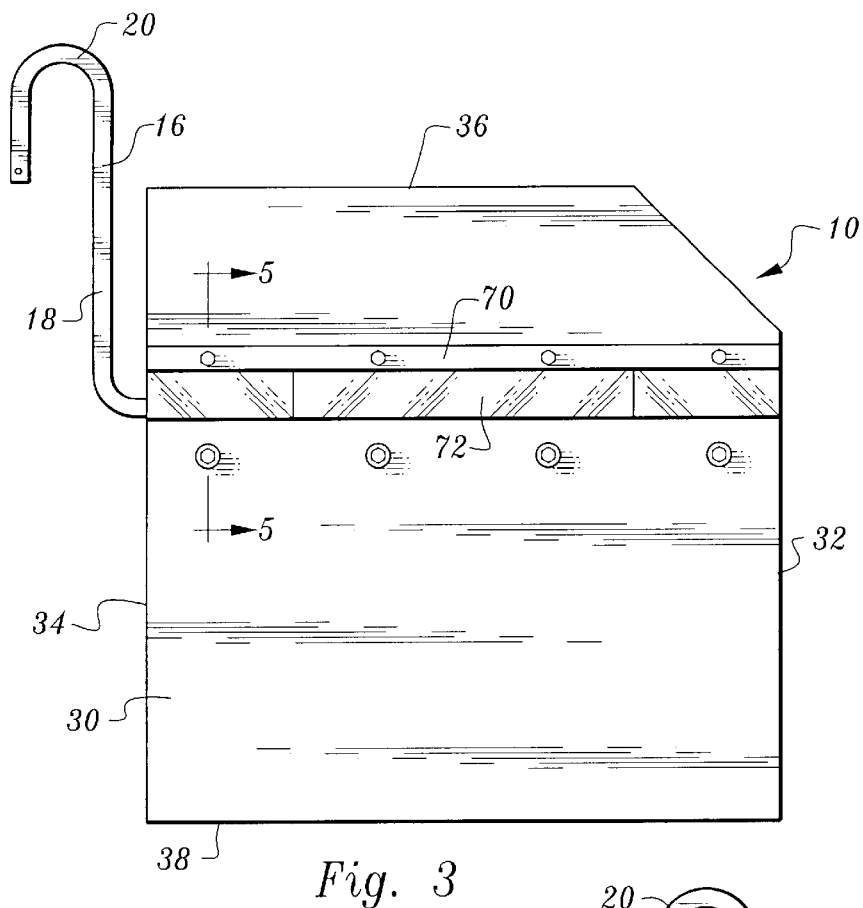
Fig. 3
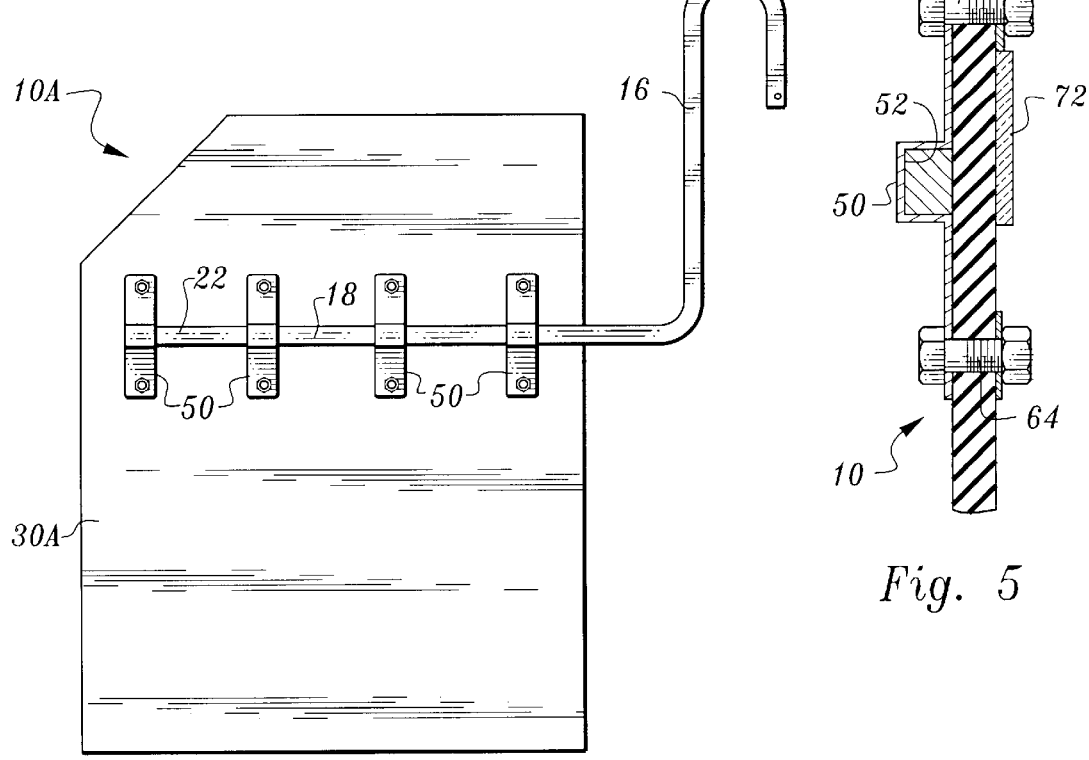
Fig. 4
Fig. 5

MUD FLAP ASSEMBLY

TECHNICAL FIELD

This invention relates to a mud flap assembly for use with trucks or other vehicles.

BACKGROUND OF THE INVENTION

Mud flap assemblies for trucks typically incorporate a mud flap depending from the top edge thereof from a bracket attached to the truck in some manner. Such arrangements have drawbacks. For example, flaps so mounted can interfere with the landing gear of the truck trailer, resulting in tangling and other damage. Furthermore, prior art approaches can result in significant stress on the flap, initiating tearing or otherwise reducing flap life. While it is known to incorporate coiled springs in hangers for top-mounted mud flaps, such devices add to the complexity and cost of the overall system.

DISCLOSURE OF INVENTION

The mud flap assembly of the present invention provides a relative inexpensive, uncomplex arrangement for providing extra clearance for a trailer landing gear as well as action and flexibility equating to that of a coiled spring-type hanger. Furthermore, stresses on the flap are reduced as compared to conventional flap hanger arrangements, extending flap life and reducing tearing.

In addition to the above advantages, the system incorporates a conspicuity strip which not only meets Federal safety regulations but adds to the overall structural integrity of the system.

The mud flap assembly of the present invention includes a hanger for attachment to a vehicle and having a generally horizontally disposed hanger portion.

The assembly also includes a mud flap of unitary construction. The mud flap has first and second mud flap side edges,.an upper mud flap edge, and a lower mud flap edge.

Connector means connects the mud flap to the hanger portion, the connector means and the hanger portion being located below the upper mud flap edge and above the lower mud flap edge.

The mud flap has an upper mud flap portion immediately adjacent to said upper mud flap edge and a lower mud flap portion immediately adjacent to said lower mud flap edge. The upper and lower mud flap portions are free to flex relative to said hanger portion.

Incorporated in the arrangement is an elongated structural element disposed over the outer surface of the mud flap and extending substantially parallel to the hanger portion. The elongated structural element not only contributes to the strength of the system but also functions as a conspicuity strip having a light reflective surface.

Other features, advantages, and objects of the present invention will become apparent with reference to the following description and accompanying drawings.

BRIEF DESCRIPTION OF DRAWINGS

FIG. 3 is an elevational view of the side of the mud flap assembly opposed to that of FIG. 2;

FIG. 4 is an elevational view of a side of the mud flap assembly incorporating a smaller mud flap than that shown in FIGS. 1–3;

FIG. 5 is an enlarged cross-sectional view taken along line 5—5 in FIG. 3; and

MODES FOR CARRYING OUT THE INVENTION

Figure 1:
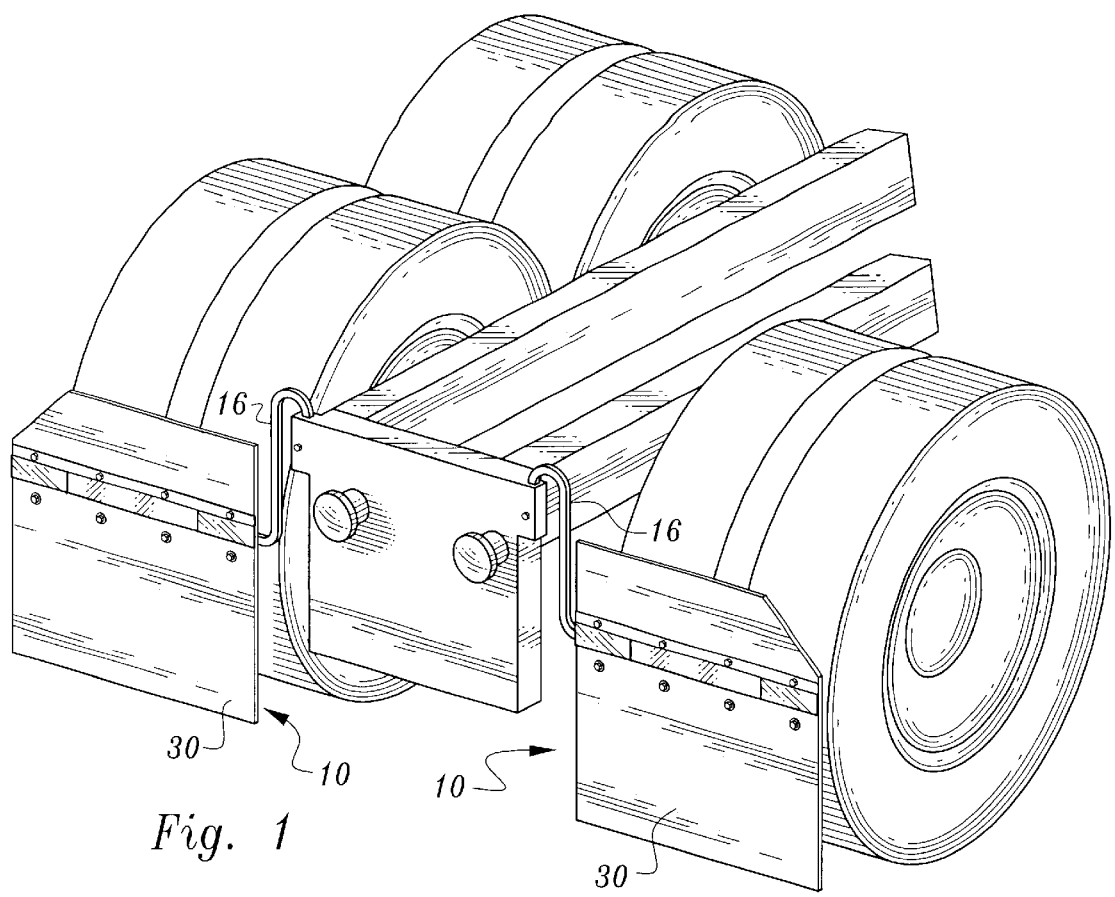
FIG. 1 is a perspective view of the rear of a truck having two mud flap assemblies constructed in accordance with the teachings of the present invention.
Figure 2:
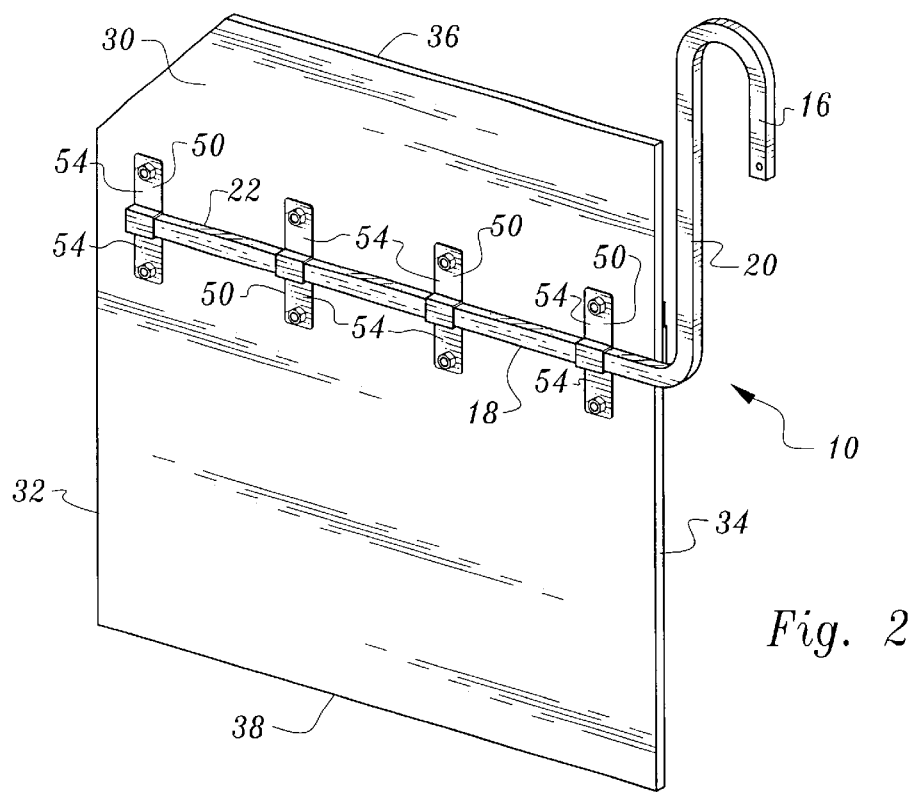
FIG. 2 is a perspective view of one side of a single mud flap assembly.
Figure 6:
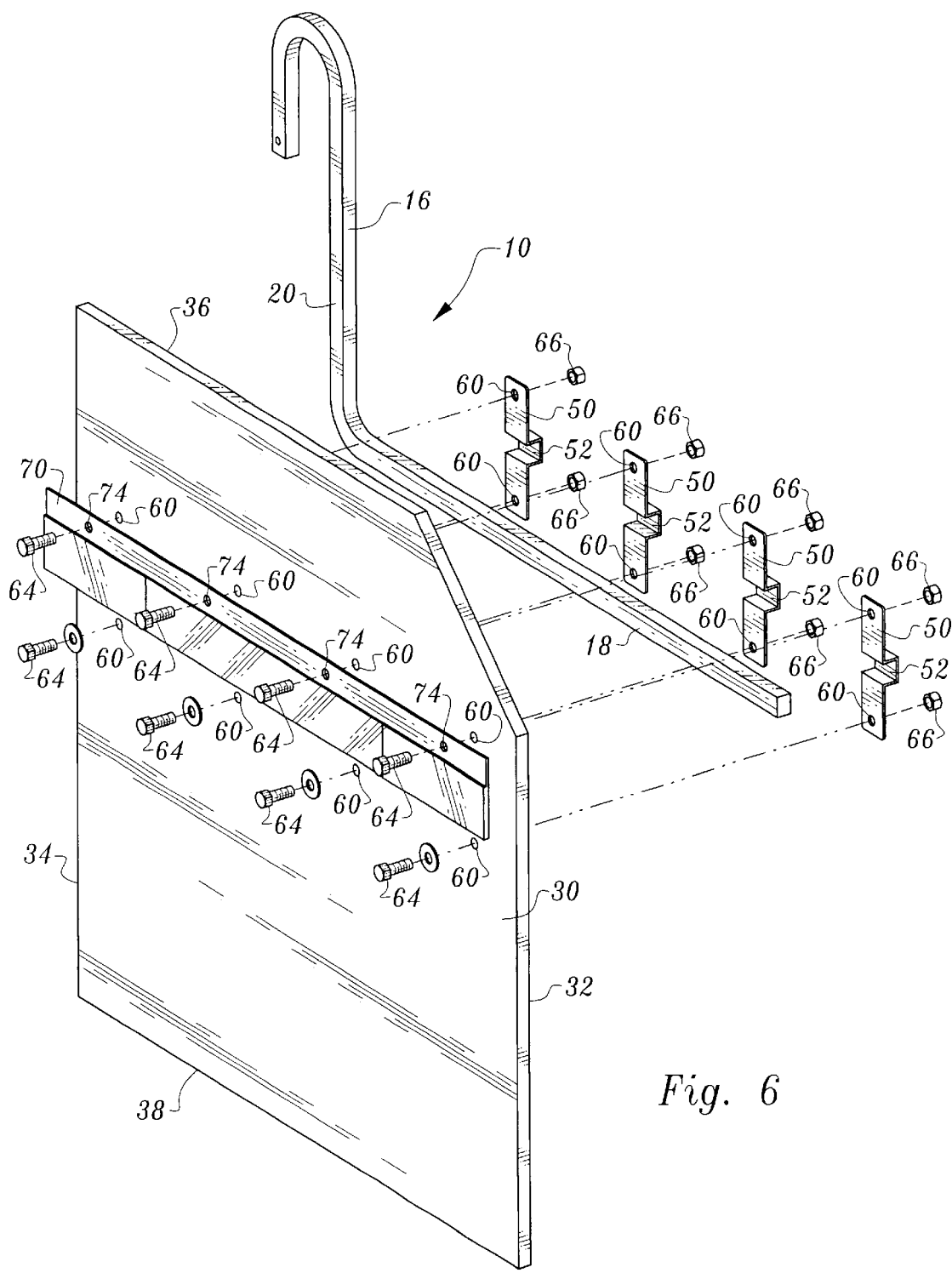
FIG. 6 is an exploded, perspective view of the mud flap assembly of FIGS. 1–3 and 5.

Referring now to FIGS. 1–3, and 5 and 6, a mud flap assembly constructed in accordance with the teachings of the present invention is generally designated by reference numeral 10. In FIG. 1 two of the mud flap assemblies are shown attached to the rear of a truck trailer.

Assembly 10 includes a hanger 16 which is in the form of a steel bar having a uniform rectangular cross-sectional configuration which is bent so that the hanger includes an elongated hanger portion 18 and an upwardly extending portion 20 forming a bight at the upper end thereof and which is secured to the truck in any suitable manner, for example mechanical fasteners, welding or the like.

The hanger portion 18 has a free unsupported distal end 22 and extends horizontally when the hanger is secured to the truck.

Assembly 10 also includes a mud flap 30 of unitary construction, the flap being formed of conventional mud flap material such as high density polyethylene. The mud flap has inner and outer surfaces and includes mud flap side edges 32, 34, an upper mud flap edge 36 and a lower mud flap edge 38.

The mud flap 30 is connected to the hanger portion 18 at a location below the upper mud flap edge 36 and above the lower mud flap edge 38. That is, a portion of the mud flap extends above the elongated hanger portion 18 and a somewhat larger portion of the mud flap extends below the hanger portion. The flap, as is conventional, is essentially rigid although it has some degree of flexibility.. During use, both the upper and lower mud flap portions just described will flex to some extent when impacted by air.

With regard to the means for providing the interconnection between the hanger and the mud flap, a plurality of brackets 50 engage the hanger portion 18 at spaced locations on the hanger portion. The brackets 50 are in the form of strips of steel or other metal which have been bent to provide recesses 52 receiving the hanger portion. The recesses 52 are sufficiently large to allow sliding movement of the brackets lengthwise along the hanger portion to adjust positioning of the brackets thereon prior to actual attachment of the brackets to the mud flap. FIG. 4, for example, shows a narrower flap 30A employed in the assembly 10A. The brackets are closer together to cooperate with the smaller mud flap.

In addition, each bracket 50 is flat at the ends 54 thereof. An opening 56 is formed in each of the bracket ends.

In the arrangement illustrated, there are four brackets 50 and thus eight openings 56. There are eight holes 60 formed in the mud flap 30 and spaced from one another. These holes 60 are lined up with the openings 56 of the brackets.

Threaded bolts 64 are inserted through the holes 60 of the flap and the openings 56 of the brackets. In the arrangement illustrated, the heads of the bolts 64 are disposed outwardly, although of course this could be reversed. Nuts 66 are threadedly engaged with the bolts to secure the mud flap and brackets together and to tighten the brackets and mud flap against the hanger portion 18 so that the mud flap is securely locked in place relative to the hanger. In the arrangement shown, washers are employed in association with some of the bolts.

It is important to note that the mud flap assembly 10 also includes an elongated structural element disposed over the outer mud flap surface which is in the form of a conspicuity strip 70 extending parallel to the hanger portion and in partial registry therewith. The conspicuity strip 70 is formed of rigid material such as metal strip material and has a light reflective surface 72. The conspicuity strip 70 defines a plurality of spaced apertures 74 which are in alignment with the upper tier of openings 56 of the brackets and the upper tier of holes 60 formed in the flap. The uppermost four bolts 64 pass through the conspicuity strip as well as the mud flap and brackets so that the conspicuity strip is maintained fixed in place, the flap clamped between the conspicuity strip and the upper bracket ends. Such an arrangement not only satisfies existing laws relating to conspicuity strips but the conspicuity strip 70 also adds structural strength which will help to distribute stresses along the mud flap to lessen wear and tear.

The invention claimed is:

1. A mud flap assembly for use with trucks or other vehicles, said mud flap assembly comprising, in combination:

a hanger for attachment to a vehicle and including a generally horizontally disposed hanger portion;

a mud flap of unitary construction and including first and second mud flap side edges, an upper mud flap edge, and a lower mud flap edge; and connector means connecting said mud flap to said hanger portion, said connector means and said hanger portion being located below said upper mud flap edge and above said lower mud flap edge, said mud flap having an upper mud flap portion immediately adjacent to said upper mud flap edge and a lower mud flap portion immediately adjacent to said lower mud flap edge, and said upper and lower mud flap portions being free to flex relative to said hanger portion, said mud flap defining a plurality of spaced holes, said connector means including a plurality of mechanical fasteners extending through said holes, said connector means additionally including a plurality of brackets engaging said hanger portion at spaced locations on said hanger portion, said plurality of brackets defining openings, and said plurality of mechanical fasteners extending through said openings, each of said brackets defining a recess receiving said hanger portion with said brackets frictionally engaging said hanger portion at said recess.

2. The mud flap assembly according to claim 1 wherein said mechanical fasteners comprise bolts having bolt heads and nuts threadedly secured to said bolts, the bolt head and nut of each mechanical fastener being disposed on opposite sides of said mud flap.

3. The mud flap assembly according to claim 1 wherein each of said brackets defines a plurality of openings receiving said mechanical fasteners with at least one of said openings and associated mechanical fastener being disposed above said hanger portion and at least one of said openings and associated mechanical fastener being disposed below said hanger portion.

4. The mud flap assembly according to claim 1 wherein said hanger portion comprises an elongated bar of substantially uniform cross-section and having an unsupported distal end.

5. The mud flap assembly according to claim 4 wherein the recesses defined by said brackets are sufficiently large to allow sliding movement of said brackets lengthwise along said elongated bar to adjust the positioning of said brackets on said elongated bar when said mechanical fasteners do not secure said brackets to said elongated bar.

6. A mud flap assembly for use with trucks or other vehicles, said mud flap assembly comprising, in combination:

a hanger for attachment to a vehicle and including a generally horizontally disposed hanger portion;

a mud flap of unitary construction and including first and second mud flap side edges, an upper mud flap edge, and a lower mud flap edge; and connector means connector said mud flap to said hanger portion, said connector means and said hanger portion being located below said upper mud flap edge and above said lower mud flap edge, said mud flap having an upper mud flap portion immediately adjacent to said upper mud flap edge and a lower mud flap portion immediately adjacent to said lower mud flap edge, and said upper and lower mud flap portions being free to flex relative to said hanger portion, said mud flap defining a plurality of spaced holes, said connector means including a plurality of mechanical fasteners extending through said holes, said connector means additionally including a plurality of brackets engaging said hanger portion at spaced locations on said hanger portion, said plurality of brackets defining openings, and said plurality of mechanical fasteners extending through said openings, said mud flap having an outer mud flap surface, said mud flap assembly additionally comprising an elongated structural element disposed over said outer mud flap surface and extending substantially parallel to said hanger portion and in at least partial registry therewith, said elongated structural element defining spaced apertures in general alignment with holes defined by said mud flap and openings defined by said brackets, at least some of said mechanical fasteners extending through said generally aligned spaced apertures, openings and holes.

7. The mud flap assembly according to claim 6 wherein said elongated structural element comprises a conspicuity strip having a light reflective surface.

8. The mud flap assembly according to claim 7 wherein said mud flap has an inner mud flap surface and wherein each of said brackets includes a pair of flat bearing surfaces bearing against said inner mud flap surface, at least one of the bearing surfaces being in opposition to said conspicuity strip to clamp the mud flaps therebetween.

* * * * *